3,208,942
LUBRICATING COMPOSITIONS CONTAINING POLYMERIC PHOSPHONITES
Peter Kirby, Kelsall, England, assignor to Shell Oil Company, New York, N.Y., a corporation of Delaware
No Drawing. Filed Mar. 6, 1961, Ser. No. 93,350
Claims priority, application Great Britain, May 6, 1960, 16,113/60
2 Claims. (Cl. 252—49.8)

This invention relates to lubricating compositions containing ashless polymeric additives and to the additives themselves, particularly additives that improve the load carrying capacity of lubricating oils, and more particularly poly-functional additives that improve not only the load carrying capacity, but also one or more other properties, e.g., the viscosity/temperature characteristics and the detergency of lubricating oils.

According to the present invention, lubricating compositions are provided which comprise a major amount of a lubricating oil and a minor amount, from about 0.01% to about 10%, preferably between about 0.1% to about 6% by weight, of an oil-soluble copolymer of (1) a dialkenyl derivative of phosphonous acid as fully defined below and (2) a phosphorus-free mono-olefinically unsaturated compound having also an olephilic hydrocarbon radical or chain of at least 8 and up to 30 or more carbon atoms, the copolymer having a molecular weight of at least 50,000 and preferably between 75,000 and 1,000,000.

The dialkenyl derivatives of phosphonous acid useful in the present invention have the general formula:

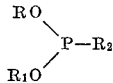

where any two of the substituents R, $R_1$ and $R_2$ are alkenyl or cycloalkenyl groups and the other substituent is a hydrogen atom or an alkyl, cycloalkyl, aryl, alkaryl or aralkyl group. Preferably R and $R_1$ are alkenyl or cycloalkenyl groups. The alkenyl groups may be $\alpha:\beta$-mono-olefinically unsaturated hydrocarbon groups, e.g., vinyl or $\alpha$ or $\beta$-alkyl substituent vinyl groups, but preferably the alkenyl groups are $\beta:\gamma$-mono-olefinically hydrocarbon groups of the formula —$CR'_2$—$CR'$=$CR'_2$ where R' is a hydrogen atom or an alkyl group preferably having not more than six carbon atoms. The alkenyl groups may be the same or different, but it is preferred that they are the same and more preferably that they are allyl groups.

The above dialkenyl derivatives of phosphonous acid may be prepared by any of the methods well known in the art. For example the vinyl diesters of phosphonous acid may be prepared by the dehydrohalogenation of compounds of the formula $(XCH_2CH_2O)_2P(R)$ where X is halogen, which compounds may themselves be prepared by reacting a phosphonous dihalide with ethylene oxide. The $\beta:\gamma$-alkenyl diesters may be prepared by the reaction between the desired $\beta:\gamma$-unsaturated alcohol and the desired phosphonous dihalide in the presence of an acid sequestrant, e.g., pyridine. Where, in the formula:

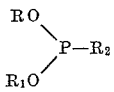

$R_1$ and $R_2$ are alkenyl groups, the desired compounds may be prepared by the reaction of alkenyl phosphonous dichloride with an equimolar mixture of alkyl and alkenyl alcohols. As examples of compounds suitable for use in the present invention there may be stated diallyl phenylphosphonite, diallyl isopropylphosphonite, dimethallyl phenylphosphonite, dimethallyl cyclohexylphosphonite, allyl methallyl phenylphosphonite, diallyl 2-ethylhexylphosphonite, divinyl phenylphosphonite, ethyl allyl allylphosphonite and allyl phenyl methallyl phosphonite. Mixtures of two or more phosphonous acid derivatives as described above may be utilized in the present invention, if desired.

The mono-olefinically unsaturated compounds with which the above phosphonous acid derivatives are copolymerized to form the copolymers of the present invention include polymerizable esters, ethers, acids or mixtures thereof, which have an oleophilic hydrocarbon chain of at least 8 carbon atoms. Suitable compounds are esters of unsaturated carboxylic acids with long chain aliphatic alcohols, e.g. esters of acrylic or $\alpha$-substituted acrylic acid and saturated aliphatic alcohols of at least 8 carbon atoms and preferably from 12 to 20 carbon atoms. Examples of such esters are decyl acrylate, lauryl acrylate, stearyl acrylate, eicosyl acrylate, docosyl acrylate, decyl methacrylate, lauryl methacrylate, cetyl methacrylate and stearyl methacrylate and mixtures thereof. Other esters include esters of long chain carboxylic acids with unsaturated alcohols, e.g. the vinyl esters of long chain carboxylic acids such as vinyl laurate, vinyl palmitate, vinyl stearate and vinyl oleate and mixtures thereof; and long chain esters of unsaturated dicarboxylic acids, such as methyl lauryl fumarate. The term "long chain" occurring in the present specification is to be interpreted as a hydrocarbon chain length of at least 8 carbon atoms and up to 20 or more carbon atoms.

Other mono-olefinically unsaturated polymerizable compounds which may be copolymerized with the phosphonous acid derivatives are $\alpha$-olefins having the formula $RCH=CH_2$ where R is an oleophilic hydrocarbon chain of at least 8 carbon atoms. Preferably such olefins have 12 to 30 carbon atoms per molecule. Examples of suitable $\alpha$-olefins are decene, undecene, tridecene, pentadecene, octadecene, eicosene and tricosene or mixtures thereof.

One or more of the above polymerizable components may be employed in the preparation of the novel copolymers of the present invention. The technical lauryl methacrylate obtained from the commercial mixture of long-chain alcohols in the $C_{10}$ to $C_{18}$ range derived from coconut oil is an especially useful oleophilic component of the novel copolymers, but the group of acrylic and $\alpha$-substituted acrylic esters of aliphatic alcohols of at least 8 carbon atoms are, in general, well suited for use as such oleophilic components. Minor proportions of lower alkyl esters of acrylic or methacrylic acids, e.g., methyl methacrylate, may additionally be present in such copolymers.

The molar ratio of phosphorous containing monomer to the oleophilic comonomer may vary between wide limits and generally lies between 20:1 and 1:20. It is preferably that the ratio lies between 1:1 to 1:20, with ratios between 1:2 and 1:10 being especially suitable. In practice, the ratio of components is determined by the degree of oil-solubility required of the copolymer, and this is readily determined for any given copolymer by conventional methods.

The copolymers of the present invention can be prepared by any suitable means. Normally the reactants are copolymerized in the presence of a catalyst. Oxygen-yielding catalysts such as organic peroxides may be used, and these may be aliphatic, aromatic, heterocyclic or alicyclic peroxides. Examples of suitable catalysts are: diethyl peroxide, tertiarybutyl hydroperoxide, di-tertiarybutyl peroxide, benzoyl peroxide, dimethyl thienyl peroxide, dilauroyl peroxide and urea peroxide. Other suitable catalysts include sodium disulfite, diethyl sulfoxide, ammonium persulfate, alkali metal perborates and azo compounds, e.g. azo-(bis-isobutyro)nitrile. The catalysts are generally used in an amount of 0.1 to 5% by weight, based on the total reactants.

The copolymerization reaction may be carried out under a variety of conditions. For example, the reaction can be carried out in the presence or absence of an inert solvent, such as a hydrocarbon; in an atmosphere of nitrogen or carbon dioxide; and at a temperature ranging from room temperature or lower to about 180° C. or higher for a period of from 2 to 48 hours.

It is preferred that the reaction be carried out in such a manner that the resulting copolymer has a molecular weight above 50,000, and more preferably between 75,000 and 1,000,000. In order to achieve copolymers of a desired molecular weight the copolymerization reaction may be stopped at any time by appropriate means. A very suitable method of controlling the reaction is to cool the reacting products and stop the free radical reaction with copper powder.

The following examples illustrate the production of copolymers according to the present invention.

EXAMPLE I

Diallyl phenylphosphonite in an amount of 8.9 g., 10.6 g. of lauryl methacrylate and 25 g. of redistilled technical white oil were dissolved in 50 ml. of sodium-dried benzene in a reaction vessel equipped with a stirrer, a dropping funnel and a condenser. The mixture was heated to a temperature of 78° C., and 0.5 g. of benzoyl peroxide dissolved in a minimum amount of benzene was added. At the end of the first, second and third hours, 10.6 g. of lauryl methacrylate were added from the dropping funnel and after six hours a further quantity of 0.5 g. benzoyl peroxide was added. The solution was stirred for a further eighteen hours. The benzene was removed from the reaction mixture and the residue stripped to a "bottoms" temperature of 120° C. at 0.4 mm. Hg pressure. The viscous product, a 66.6% concentrate of the copolymer of diallyl phenylphosphonite with lauryl methacrylate with a molar ratio of 1:4 in technical white oil, on analysis indicated that the phosphorus-containing monomer had almost quantitatively polymerized.

EXAMPLE II

Diallyl phenylphosphonite in an amount of 282 g. and 705 g. of lauryl methacrylate were dissolved in 493 g. of a mineral lubricating oil having a viscosity of 10 cs. at 210° F., and heated to 150° C. To the heated mixture were added 7.5 g. of ditertiary-butyl peroxide and the mixture stirred for 5 hours. A further quantity of 7.5 g. of ditertiary-butyl peroxide was added and the stirring continued for 4 hours. The resulting copolymer had a molar ratio of phosphorus-containing monomer to lauryl methacrylate of 1:2.2 and analysis showed that the diallyl phenylphosphonite had almost quantitatively polymerized.

EXAMPLE III 150 g. of diallyl phenylphosphonite and 680 g. of lauryl methacrylate were copolymerized, using ditertiary-butyl peroxide as catalyst in 415 g. of a mineral oil having a viscosity of 10 cs. at 210° F. The reaction temperature was maintained at 145° C. for 5 hours after which time the mixture was cooled to 50° C. and then shaken with 15 g. of copper powder for 15 minutes. The copolymer solution was then filtered through a sintered funnel using "Clarcel" filter aid. The resulting copolymer had a molar ratio of phosphorus-containing monomer to methacrylate of 1:4.

EXAMPLE IV 101.6 g. of lauryl methacrylate and 17.4 of ethyl allyl allyl-phosphonite were dissolved in 119 g. of technical white oil and heated to 150° C. 2 g. of di-t-butyl peroxide were added and the mixture was stirred for 6 hours. The resulting copolymer, as a 50% solution in technical white oil, comprised the phosphorus and the methacrylate monomers in 1:4 ratio.

Other copolymers within the scope of the present invention include diallyl phenylphosphonite/stearyl methacrylate, diallyl phenylphosphonite/lauryl acrylate, dimethallyl isopropylphosphonite/lauryl methacrylate, divinyl phenylphosphonite/vinyl laurate, diallyl ethylphosphonite/octadecene, diallyl phenylphosphonite/vinyl stearate, diallyl phenylphosphonite/methyl lauryl fumarate.

The lubricating oil in the lubricating compositions of the invention can be any natural or synthetic oil having lubricating properties. Thus, the oil can be a hydrocarbon lubricating oil obtained from paraffinic or naphthenic crude or mixtures thereof. The viscosity of these oils may vary over a wide range, such as from 100 SUS at 100° F. to 100 SUS at 210° F. The hydrocarbon lubricating oil may be blended with fatty oils such as castor oil or lard oil, and/or with synthetic lubricating oils such as polymerized olefins, copolymers of alkylene glycols and alkylene oxides, organic esters, e.g., di(2-ethylhexyl)sebacate, dioctyl phthalate and trioctyl phosphate and polyalkyl silicone polymers such as dimethyl silicone polymers. If desired, the synthetic lubricating oils may be used as the sole base lubricating oil or admixed with fatty oils or derivatives thereof.

In the lubricating compositions of the present invention the polymeric additive is present in a minor proportion by weight based on the total composition, generally from 0.01% to 20% and preferably from 0.1% to 8% by weight.

It will be understood that the lubricating compositions of the invention may be modified by the addition thereto of minor proportions of other additives such as metal dithiophosphates, e.g., zinc di-2-ethylhexyl dithiophosphate, metal organic sulfonates, e.g., neutral or basic calcium, barium or zinc petroleum sulfonate; metal thiocarbonates, e.g., zinc, chromium or calcium dibutyl or diamyl dithiocarbamate; amines, e.g., phenyl-alpha-naphthylamine or octadecylamine; alkylated phenols and alkylated bisphenols, e.g., 2,6-ditertiary-butyl-4-methylphenol, 2,6-ditertiarybutyl-4-hydroxybenzyl alcohol and 4,4'-methylene bis-(2,6-ditertiarybutyl phenol); organic sulfides, e.g., dibenzyldisulfide, VI improvers, e.g., methacrylate polymers, e.g., the "Acryloids" 150 or 710.

Lubricating compositions of the present invention are useful as engine oil, gear oils, turbine oils and various other fields of lubrication where detergency, viscosity index and load carrying properties are essential.

Compositions of this invention are illustrated by the following formulations; the ratios in brackets being the mole ratios of the monomers used for preparing the copolymers. The mineral lubricating oil used is an oil having a viscosity of 10 cs. at 210° F.

Composition A:
    Copolymer of Example I _____ 4% wt.
    Mineral oil (visc. 10 cs. at 210° F.) ____ Balance
Composition B:
    Copolymer of Example I _____ 4% wt.
    4,4'-methylene bis(2,6-ditert.
      butyl phenol) _____ 0.75% wt.
    Mineral oil (visc. 10 cs. at 210° F.) ____ Balance
Composition C:
    Copolymer of Example II _____ 3.5% wt.
    Mineral oil (SAE 30) _____ Balance
Composition D:
    Copolymer of Example III _____ 2.7% wt.
    Mineral oil (SAE 30) _____ Balance
Composition E:
    Copolymer of Example IV _____ 6.8% wt.
    Methacrylate polymer (Acryloid 710
      made by Rohm & Haas as a VI
      improver) _____ 6% wt.
    Mineral oil (SAE 10W-30) _____ Balance Composition F:
    Copolymer of Example I _____ 5% wt.
    4,4'-methylene-bis(2,6-ditert.
      butyl phenol) _____ 0.5% wt.
    Tricresyl phosphate _____ 0.8% wt.
    Dicresyl phosphate _____ 0.04% wt.
    Mineral oil (SAE 30) _____ Balance
Composition G:
    Copolymer of divinylphenylphosphonite/
      vinyl laurate _____ 5% wt.
    Mineral oil (SAE 10) _____ Balance
Composition H:
    Copolymer of diallyl ethylphosphonite/
      alpha-octadecene _____ 6% wt.
    Mineral oil (SAE 20) _____ Balance
Composition I:
    Copolymer of diallyl phenylphosphonite/
      methyl lauryl fumarate _____ 5% wt.
    4,4'-methylene-bis(2,6-ditert.
      butyl phenol) _____ 0.5% wt.
    Mineral oil (SAE 30) _____ Balance In order to show the superior extreme pressure properties of lubricating compositions of the present invention to neat or compound lubricating oils, the compositions identified in Table I were tested in the four-ball machine and the results were as follows:

*Table I*

| Composition | Four-ball test | |
|---|---|---|
| | Wear scar diameter in mms. (after 100 mins. at 50 kgs.) | 2½ sec. seizure delay load (kgs.) |
| Composition B | 1.04 | 92 |
| Composition X (mineral oil containing 4.5% of a nitrogen-containing detergent copolymer and 1% tricresyl phosphate | 1.7 | 92 |
| Mineral oil (10 cs. at 210° F.) | (¹) | 65 |

¹ Excessive wear.

The composition according to the present invention, i.e. composition 3 exhibits very favorable E.P. properties compared with the base oil alone, and with a comparative composition containing known additives.

In an assessment of the dispersant characteristics of oil compositions of the present invention, 1 part by weight of used straight mineral oil from a diesel engine, which oil contains about 2% wt. of oil-insolubles, was mixed with 5 parts of an unused mineral oil having a viscosity of 10 cs. at 210° F. In this blend the insoluble particles were clustered. Other blends were made containing, as before, ⅙ of used oil and ⅚ of a series of increasing concentrations of one of the additives according to the present invention. At a particular concentration the insoluble particles became dispersed and this concentration was taken as a measure of the dispersancy of the additive. The polymeric additive concentration prepared in Example III was dispersant in the above test at 0.5% concentration in mineral oil. The same additive, in a 2% by weight concentration in a mineral oil having a viscosity of 10 cs. at 210° F. together with 0.75% of 4,4'-methylene-bis(2,6-ditertiarybutyl phenol) exhibited good low temperature performance properties when used in an automotive engine as is evidenced by the lessening of the deposits on the engine parts.

Copolymers of this invention can be used to improve fuel oils with respect to screen clogging, greases to impart extreme pressure properties and hydraulic fluids with respect to wear inhibition and the like.

I claim as my invention:

1. A lubricating oil composition comprising a major amount of mineral lubricating oil and from about 0.01% to about 10% of an oil-soluble copolymer of diallyl phenyl phosphonite and $C_{8-18}$ alkyl methacrylate in the mol ratio of 1:1 to 1:20, respectively, said copolymer having a molecular weight of from about 50,000 to about 1,000,000.

2. A lubricating oil composition comprising a major amount of mineral lubricating oil and from about 0.01% to about 10% of an oil-soluble copolymer of diallyl phenylphosphonite and lauryl methacrylate in the mol ratio of 1:1 to 1:20, respectively, said copolymer having a molecular weight of from about 50,000 to about 1,000,000.

References Cited by the Examiner

UNITED STATES PATENTS

| | | | |
|---|---|---|---|
| 2,497,638 | 2/50 | Fon Toy | 260—86.1 |
| 2,577,796 | 12/51 | Morris et al. | 252—49.8 X |
| 2,678,919 | 5/54 | Tutwiler et al. | 252—56 |
| 2,867,610 | 1/59 | Fon Toy et al. | 260—78.5 |
| 2,892,791 | 6/59 | Lowe et al. | 252—56 |

DANIEL E. WYMAN, *Primary Examiner.*

JULIUS GREENWALD, *Examiner.*